United States Patent
Febrer et al.

(10) Patent No.: US 9,037,363 B2
(45) Date of Patent: May 19, 2015

(54) METHOD OF OPERATING A MOTOR VEHICLE TRANSMISSION SYSTEM

(75) Inventors: Pascal Febrer, Paris (FR); Nicolas Romani, Paris (FR); Philippe Saint Loup, Jouars Pontchartrain (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 224 days.

(21) Appl. No.: 13/640,396

(22) PCT Filed: Apr. 11, 2011

(86) PCT No.: PCT/FR2011/050825
§ 371 (c)(1),
(2), (4) Date: Jan. 17, 2013

(87) PCT Pub. No.: WO2011/128568
PCT Pub. Date: Oct. 20, 2011

(65) Prior Publication Data
US 2013/0110359 A1    May 2, 2013

(30) Foreign Application Priority Data
Apr. 12, 2010 (FR) .................................... 10 52779

(51) Int. Cl.
*G06F 17/00* (2006.01)
*B60K 23/08* (2006.01)

(52) U.S. Cl.
CPC ............ *G06F 17/00* (2013.01); *B60K 23/0808* (2013.01); *B60W 2540/04* (2013.01)

(58) Field of Classification Search
CPC ............................. B60K 23/0808; G06F 17/00
USPC ................................................. 701/51, 69
See application file for complete search history.

(56) References Cited

U.S. PATENT DOCUMENTS

| | | | |
|---|---|---|---|
| 5,373,912 A | 12/1994 | Haiki et al. | |
| 6,132,332 A | 10/2000 | Yasui | |
| 2002/0033293 A1 | 3/2002 | Fukuda et al. | |
| 2011/0301825 A1* | 12/2011 | Grajkowski et al. | 701/102 |
| 2013/0226428 A1* | 8/2013 | Nihei et al. | 701/70 |

FOREIGN PATENT DOCUMENTS

| | | |
|---|---|---|
| DE | 199 23 970 | 12/1999 |
| EP | 1 188 596 | 3/2002 |

OTHER PUBLICATIONS

International Search Report Issued Aug. 19, 2011 in PCT/FR11/50825 Filed Apr. 11, 2011.

* cited by examiner

*Primary Examiner* — Fadey Jabr
*Assistant Examiner* — Yazan A Soofi
(74) *Attorney, Agent, or Firm* — Oblon, McClelland, Maier & Neustadt, L.L.P.

(57) ABSTRACT

A method of operating a transmission system of an automotive vehicle, the transmission system including a mechanism of mechanically coupling first and second axles of the transmission system, a status of the coupling mechanism defining a number of transmission modes. The transmission system includes a button of pulse type controlling selection of a transmission mode and, after the vehicle has stalled, the transmission mode that is active following restarting of the vehicle is the mode that was active before the vehicle stalled.

8 Claims, 8 Drawing Sheets

METHOD OF OPERATING A MOTOR VEHICLE TRANSMISSION SYSTEM

BACKGROUND

The present invention relates to a method for operating a four wheel drive-type transmission system of a motor vehicle. The invention also relates to a transmission system operating in this way. It also relates to a vehicle comprising such a transmission system. The invention relates finally to a computer program.

The invention applies to a vehicle equipped with a controlled four wheel drive transmission system (4×4). The objective of this type of vehicle is to enhance the services such as the behavior and drivability, particularly on take-off, that is to say when a vehicle is set in motion and when crossing an obstacle.

A transmission system of the fourwheel drive-type is known in which an electromagnetically controlled means for mechanically coupling a front axle to a rear axle (coupler) can operate according to three states defining three modes of operation of the transmission system, a first transmission mode in which only a portion (variable) of the maximum torque capacity from a torque source (the engine of the motor vehicle) and intended for the rear axle system is effectively transmitted to the rear axle system; this first mode, called "automatic 4*4" mode, corresponding to a so-called "controlled" coupler, that is to say that a control system of the coupler automatically manages its operation, in particular the quantity of torque that is transmitted or transmissible, a second transmission mode in which all of the maximum torque capacity from the torque source and intended for the rear axle system is actually transmitted to the rear axle system; this second mode, called "all-terrain 4*4", mode corresponding to a so-called "closed" coupler, that is to say that it is locked in a state defining a fixed transmissible maximum torque value, the locking preferably being electrical, a third transmission mode in which no torque (or a negligible torque) from the torque source is transmitted to the rear axle system; this third mode, called "4*2" mode, corresponding to a so-called "open" coupler, that is to say that the coupler is deactivated or that it transmits only a negligible quantity of torque.

Thus, the driver should know the functional state of the current 4×4 mode of the vehicle from the basis of his or her interaction with the 4×4 mode selection button. The vehicle has to be able to also communicate to the driver certain information such as, for example, elevated heating-up of the 4×4 coupler or the failure of the 4×4 system. The system also has to be able to check the compatibility of the speed and temperature conditions applied to the coupler. Thus, there is a need for a man-machine interface (MMI) device and for the interpretation of the driver's demand to be applied to a vehicle equipped with a 4×4 transmission system.

The document FR2885427 discloses a device for monitoring and/or controlling equipment of a motor vehicle with push buttons and a touch pad.

The document WO 99/20483 discloses an equipment control button on a dashboard of a powered vehicle.

BRIEF SUMMARY

The aim of the invention is to provide a method for operating a transmission system that makes it possible to remedy the problems stated previously and that enhances the operating methods known from the prior art. In particular, the invention proposes an operating method that makes it possible to enhance driving comfort and avoid any inconvenience or any doubt on the part of the driver regarding his or her vehicle so that he or she can concentrate on the driving.

The method according to the invention governs the operation of a transmission system of a motor vehicle, the transmission system comprising a means for mechanically coupling the first and second axles of the transmission system, the state of the coupling means defining a number of transmission modes. The transmission system comprises a pulse-type button controlling the selection of the transmission mode and, after the vehicle has stalled, the transmission mode that is active following the restarting of the vehicle is the mode that was active before the vehicle stalled.

The method may comprise a step of storing in memory the transmission mode that is active at the time of the stall and a step of keeping this transmission mode in this memory for a limited duration, for example equal to 30 seconds.

The invention also relates to a computer-readable data storage medium on which is stored a computer program comprising computer program code means for implementing the steps of the method defined previously.

According to the invention, the transmission system of a motor vehicle comprises a means for mechanically coupling the first and second axles of a transmission system, the first axle being driven by default and the second axle being driven optionally according to the state of the coupling means. The system comprises hardware and/or software means for implementing the method defined previously.

According to the invention, the motor vehicle comprises a transmission system defined previously.

The invention also relates to a computer program comprising a computer program code means suitable for implementing the steps of the method defined previously, when the program is run on a computer.

BRIEF DESCRIPTION OF THE DRAWINGS

The appended drawing represents, by way of example, an implementation of an operating method according to the invention and an embodiment of a transmission system according to the invention.

DETAILED DESCRIPTION

Figure 1:
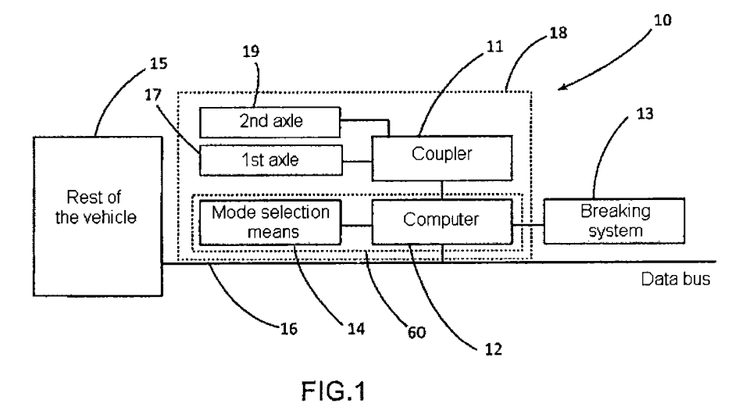
FIG. 1 is an embodiment of a motor vehicle comprising a four-wheel drive transmission system with four drivewheels according to the invention.

An embodiment of a motor vehicle 10 according to the invention represented in FIG. 1 comprises an embodiment of a transmission system 18 of the fourwheel drive-type, in particular of the controlled fourwheel drive-type, and a braking system 13. This transmission system and this braking system are linked to the rest 15 of the vehicle via a bus 16, via a computer 12.

The transmission system 18 mainly comprises a first axle 17 of wheels of the motor vehicle, for example a front axle, a second axle 19 of wheels of the motor vehicle, for example a rear axle, a means 11 for mechanically coupling, for example with electromagnetic control, the first and second axles (coupler) and a control system 60 for the state of the mechanical coupling means. The control system comprises a means 14, notably a button, for controlling the selection of the mode of operation of the transmission system and a computer 12.

The transmission system is connected to a source of torque for driving the motor vehicle (an engine driving the vehicle).

Although not represented, the transmission system comprises means for determining vehicle state variables, such as, for example, means for obtaining the speed of rotation of each wheel, means for obtaining the temperature of the coupler, means for obtaining state information different equipment of the vehicle, notably means for obtaining information on malfunctions and activities of certain computers and electronic or automatic computation means. The transmission system comprises a means for selection by the user (for example on the dashboard) of a system operating mode, notably a first "automatic 4*4" mode, a second "all-terrain 4*4" mode or a third "4*2" mode, a means for detecting, from the state variables of the vehicle and/or of the system, the driver's demand and the running conditions (acceleration, braking, slipping, etc.) and a control means for switching the system to a determined mode according to the mode selected by the driver, the driver's demand and the running conditions of the vehicle. The transmission system, in particular the control system of the mechanical coupling means, also comprises all the hardware and/or software means making it possible to implement the methods that are the subject of the invention. In particular, the control system, especially the computer, may comprise a computer program comprising a computer program code means suitable for implementing the steps of the methods that are the subject of the invention.

In the transmission system, the first axle (for example the front axle, respectively the rear axle) is driven by default by the torque source. Conversely, the second axle (for example the rear axle, respectively the front axle) is driven only optionally according to the state of the coupler.

In this respect, according to the state of the coupler, the transmission system offers the following three operating modes:

a first transmission mode in which only a portion (variable) of the maximum torque capacity from the torque source and intended for the second axle is actually transmitted to the second axle; this first mode, called "automatic 4*4", mode, corresponding to a so-called "controlled" coupler, that is to say that the control system of the coupler automatically manages its operation, in particular the quantity of torque that is transmitted or transmissible, a second transmission mode in which all of the maximum torque capacity from the torque source and intended for the second axle is actually transmitted to the second axle; this second mode, called "all-terrain 4*4" mode, corresponding to a so-called "closed" coupler, that is to say that it is locked in a state defining a fixed transmissible maximum torque value, a third transmission mode in which no torque or only a negligible torque from the torque source is transmitted to the second axle; this third mode, called "4*2" mode, corresponding to a so-called "open" coupler, that is to say that the coupler is deactivated or that it transmits only a negligible quantity of torque.

Technologically, the coupler may be of the friction type, that is to say that it comprises friction disks intended to come into contact with one another to transmit the torque and an actuator means to separate or bring these disks into contact with one another. This actuator means is controlled by the computer 12. The coupler may in particular be a current-controlled multiple-disk clutch.

Figure 2:
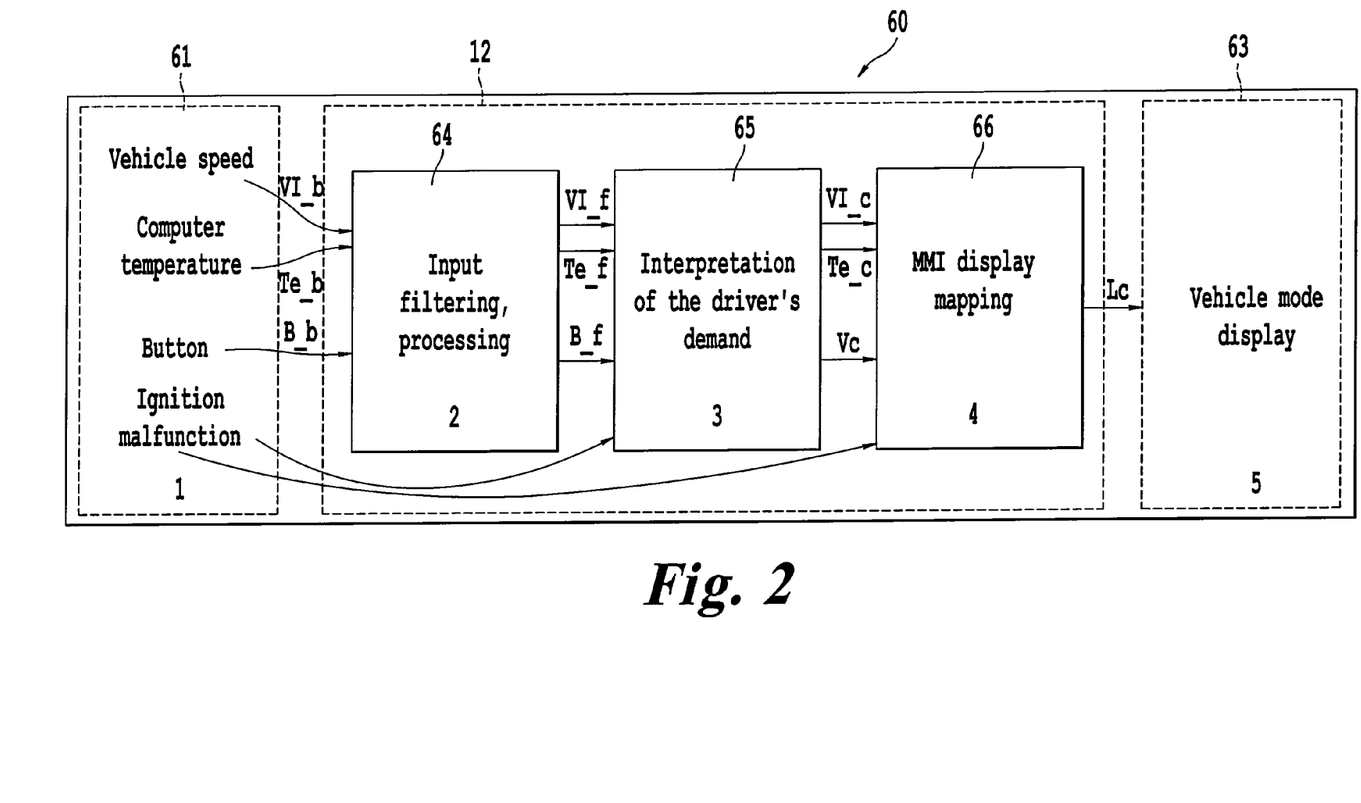
FIG. 2 is a diagram of an electronic architecture governing the operation of a transmission system according to the invention and making it possible to implement the operating method according to the invention.

As represented in FIG. 2, the control system 60 preferably comprises a first module 61 to collect a variety of information internal and/or external to the transmission system, in particular the vehicle speed, the temperature of the coupler, and the state of the transmission mode selection control means, information concerning the malfunctioning of certain equipment and information concerning the activity of certain computers. This information is then processed in the computer 12, then information signals, for example visual and/or audible, are then output by an information means 63 for the attention of the driver.

Figure 3:
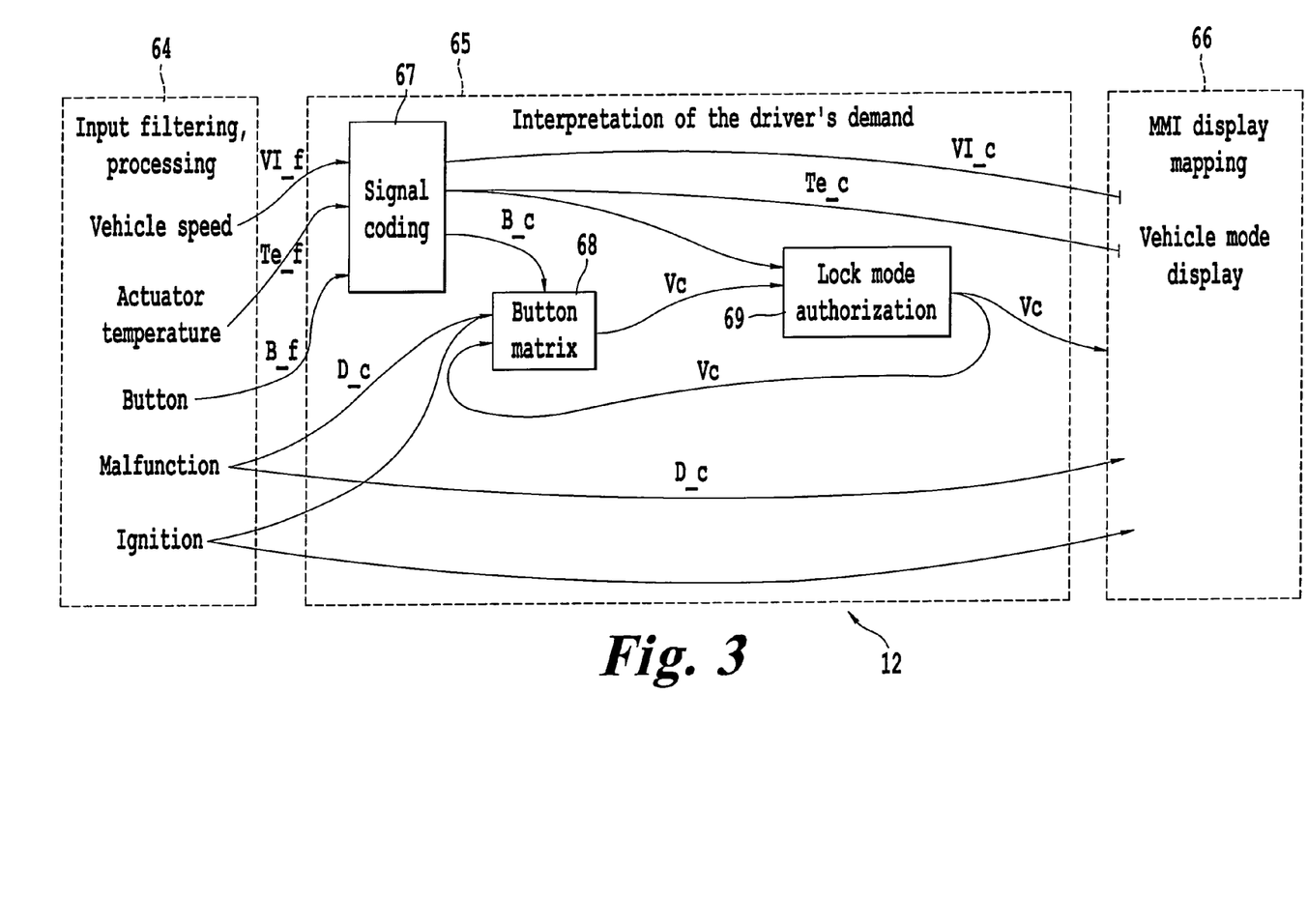
FIG. 3 is a detailed diagram of different processing blocks implemented in a computer.

As represented in FIG. 3, the computer 12 implements a number of modules. A first module 64 filters and processes the information received by the computer. A second module 65 uses this information to interpret the driver's demand and to determine the operation of the transmission system to be implemented and a third module 66 determines, on the basis of the conclusions of the second module, the information that has to be output for the attention of the driver.

In the second module 65, a first block 67 codes the information to be transmitted to the driver, a second block 68 manages the interpretation which has to be made of the state of the transmission mode selection control means and a third block 60 manages an authorization of operation of the transmission system in a particular transmission mode.

An implementation of an operating method according to the invention is described hereinbelow with reference to FIGS. 4 to 7.

A signal V_Failure_Class represents the possible categories of faults of the 4×4 transmission system or of the vehicle. For example, this signal can take values between 0 and 3, where 0 identifies the absence of a serious fault and 3 identifies the most severe faults. A table below maps the signal values to the severities of the faults.

| V_Failure_Class | Meaning |
| --- | --- |
| 0 | No fault detected |
| 1 | Fault not affecting the 4 × 4 function |
| 2 | Fault having a small impact on the 4 × 4 function |
| 3 | Serious fault for the 4 × 4 function |

The signal V_Failure_Class is generated by a set of malfunction detection functions of the 4×4 functional model. It can be constructed from a measurement, from a computation or simply by a simple algorithm combining the state of one or more other state signals or values. Depending on the nature of the problem identified, a 4×4 function impact classification is assigned to it, and therefore a value is assigned to it.

A signal with two components, Ignition/Master Operation State (MOS), represents the state of operation of the vehicle and of the computer 12. More specifically, it specifies the different states of activation of the computer. Tables below indicate possible different values for these components.

| Ignition | | |
|---|---|---|
| V (V_Ignition) | Value | Meaning |
| Ignition On | 0 | Switch off |
| Ignition Off | 1 | Switch on |

| MOS | | |
|---|---|---|
| MOS (V_MasterOperationState) | Value | Meaning |
| MasterState_Standby | 0 | Undefined state |
| MasterState_Init | 1 | Initialization |
| MasterState_Run | 2 | Running |
| MasterState_Shutdown | 3 | Shutting down |

An output signal V_flag_x_MMILed makes it positive to code information to be played back to the driver via the human-machine interface, in particular via a display and/or sound means thereof, such as an element of the dashboard of the vehicle or a loudspeaker.

This signal is formatted with the input signals described previously: V_Failure_Class, containing malfunction information, and Ignition/MOS, containing computer and/or vehicle activation state information, and with additional input signals. The formatting of this signal is, for example, performed using a table 50 represented in FIG. 7. This table translates, for example, a four-input state matrix allowing for all possible combinations.

The interleaning of the signal V_Failure_Class makes it possible to adjust the signaling inside the passenger compartment on the basis of one or more failure levels, with or without the progressiveness of the trend in these levels.

The signal V_flag_x_MMILed therefore makes it possible to adapt to the situations and return to the passenger compartment an appropriate visual or audible signaling. This can be represented, such as, for example, for a signal indicating a serious fault, by an audible warning and/or the flashing or steady display of an indicator light in the passenger compartment or on the dashboard of a service key.

The ignition signal (vehicle switched on) representing the activation state of the system, indicates, for example, that, if the vehicle is not ready, the dashboard must display nothing during the initialization or stopping phases.

The use of the Ignition and/or MOS signals to format the signal V_flag_x_MMILed can make it possible to manage the playback of the information in the passenger compartment, such as, for example, the display on the dashboard of light-emitting diodes. For example, when the ignition switch is off (Ignition OFF), the computer does not necessarily go to sleep like the rest of the electrical and/or electronic systems. It may, for example, be desired in this situation not to want to display on the dashboard the current transmission mode selection state, but rather to switch off the indicator lights or simply to display a specific state according to certain situations or initialization levels.

It should be noted that the output signal V_flag_x_MMILed is a function of the signal V_flag_x_DriverDemand translating the transmission mode request formulated by the driver. Although the information to be played back to the driver and his or her transmission mode request are complementary, a certain redundancy is deliberately applied so as to lock the playback of the current transmission mode information in the passenger compartment in order to eliminate any ambiguities and to comply with specifications in case of modification of the construction of the signal V_flag_x_DriverDemand. This redundancy or this dependency contributes to the robustness of the driver information function.

In one implementation of the control method according to the invention, it is possible to lock the operation of the transmission system in the "all-terrain 4*4" operating mode of the transmission device. This possibility may be present when the button controlling the operating modes of the transmission system operates by pulses, that is to say when each pulse on the control button enables the transition from one operating mode to another.

Thus, when the driver has selected the "all-terrain 4*4" mode, in the case of the ignition being switched off and, in particular, after the engine has stalled (commonplace in all-terrain use), the "all-terrain 4*4" mode is stored and retained if the driver switches on the ignition again and then restarts in the TLock-Latch seconds following the previous switching off of the ignition. The TLock-Latch duration is adjusted in the course of the final adjustments and should be greater than the duration needed to restart the engine after stalling and represents the time threshold of an engine stall or of a temporary switching off of the switch which is truly deliberate and which thus does not convey any ambiguity concerning this wish. For example, the TLock-Latch duration has the value 30 seconds. If the ignition remains switched off beyond this duration, the system starts in "automatic 4*4" mode, assuming that it is a different running phase. The driver must therefore reselect the "all-terrain 4*4" mode with the control button.

The function profits from the fact that the computer takes a certain time to turn off electrically after the switching off of the switch for reasons of safety and/or of preservation of the mechanical members. It is possible, for example, to exploit this time to calculate their temperatures rather than to measure them and to wait for these members to cool. The computer is therefore turned off only after a minimal time (determined in the final adjustment phases) but which is possibly variably greater for the above reasons. For the example, it can be said that this minimal electrical outage time is 120 seconds. The function makes it possible to retain in memory the last selection mode chosen for a certain time, TLock-Latch, if the switch is switched off. This makes it possible, for example in the case of an engine stall, to switch off and turn on the ignition switch again without losing the memory of the preceding transmission mode, avoiding confusion and enhancing the comfort of the user.

In one implementation of the control method according to the invention, it is not possible to retain the "all-terrain 4*4" operating mode beyond the first speed threshold. In fact, beyond this first speed threshold, there is an immediate, and possibly definitive (with no specific action from the driver), change to "automatic 4*4" mode. Complementing this, the control method according to the invention may be such that, following an overshoot of a second speed threshold (lower than the first speed threshold), this overshoot lasting for a time, in particular an uninterrupted time, preferably between 30 seconds and 2 minutes, for example 50 seconds, the control method imposes a change to "automatic 4*4" operating mode as previously.

Figure 5A:
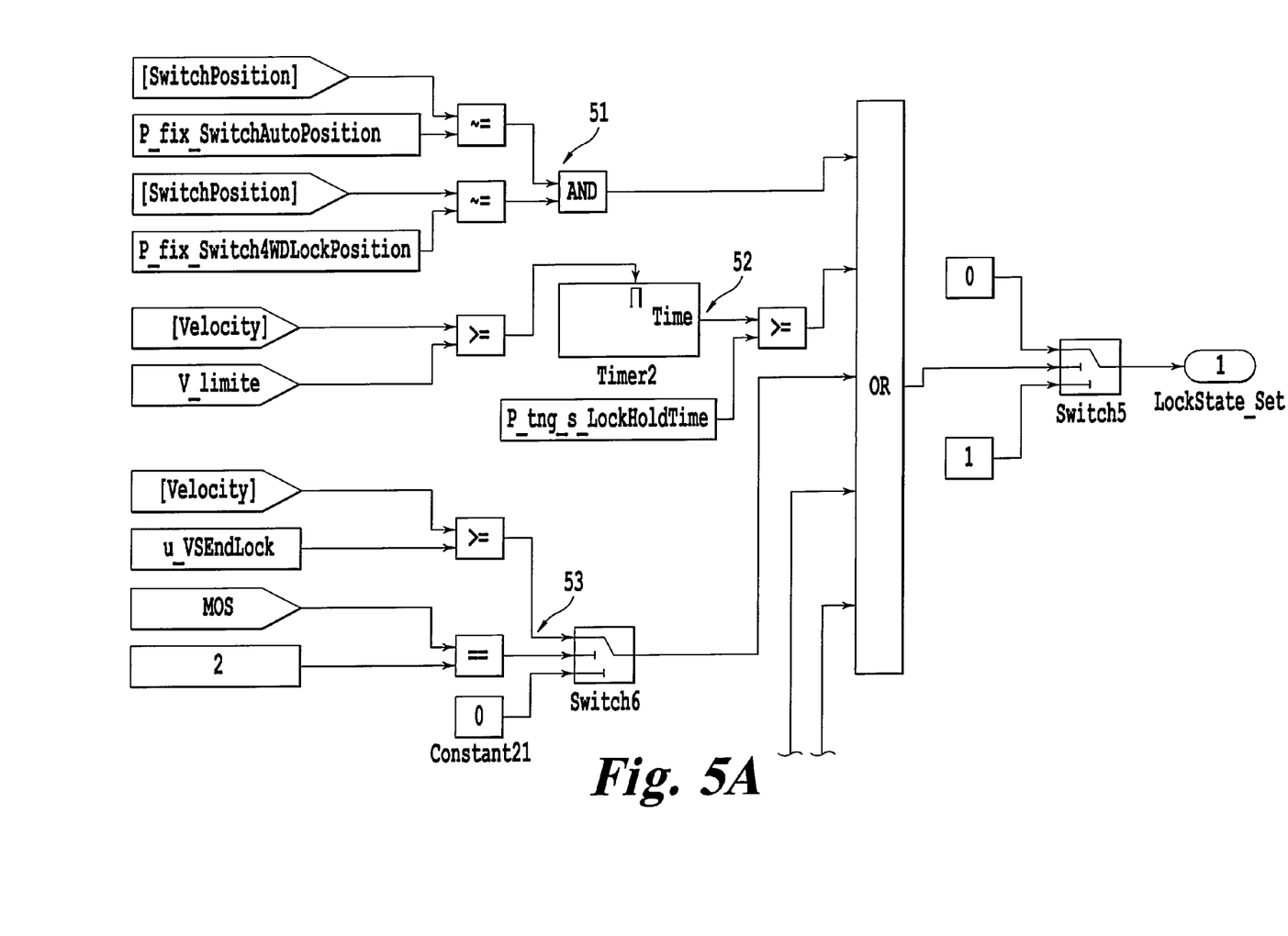
FIGS. 5A and 5B are a block diagram translating the logic of automatic switchover from a first transmission mode to a second transmission mode under particular conditions.
Figure 5B:
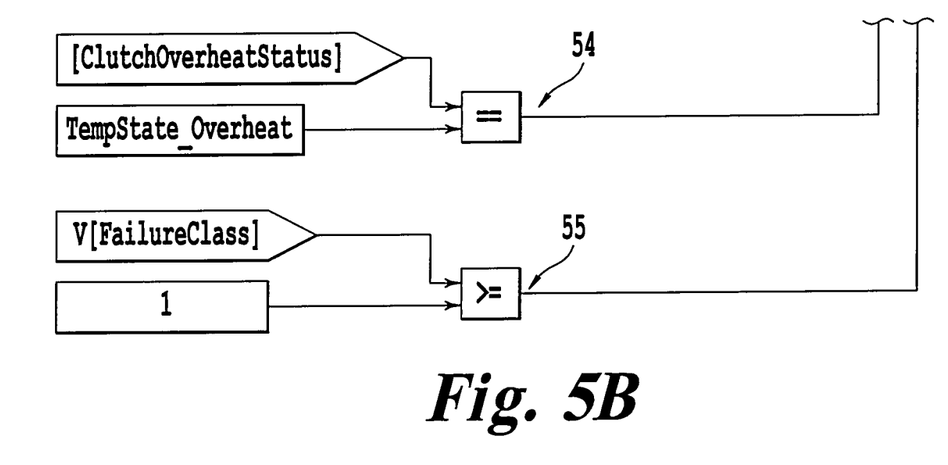

One embodiment of a logic allowing for the switchover procedure from the "all-terrain 4*4"mode to the "automatic 4*4" mode as explained previously is described below in more detail with reference to FIGS. 5A and 5B.

In a logic branch 51, the state of the transmission system operating mode control button is checked in order to make sure that it is not different from the "all-terrain 4*4" or "automatic 4*4" position.

In a logic branch 52, a test is carried out, for a certain duration, as to whether the vehicle speed (measured or calculated) is greater than the second limit speed. This duration P_tng_s_LockHoldTime can, for example, be set at 50 seconds. In the example of FIGS. 5A and 5B, the second threshold speed is set, for example, at 50 km/h. In fact, such a speed threshold can be considered to be moderately high but over the duration not compatible with the "all-terrain 4*4" mode or all-terrain obstacle driving.

In a logic branch 53, a test is carried out as to whether the vehicle speed (measured or calculated) is greater than the first limit speed that can be obtained from a calculation based on variables, this first limit speed u_VSEnd-l_ock being able to take the value of 90 km/h. Since this speed is strictly incompatible with the "all-terrain 4*4" mode, the switchover to "automatic 4*4" mode is then immediate. Furthermore, the MOS signal must be strictly equal to the mode 2=Running in this eventuality.

In a logic branch 54, a test is carried out to detect any overshoot of the 4*4 coupler overheating threshold: clutchOverheatStatus=TempState_Overheat.

In a logic branch 55, a test is carried out to detect any failure: V_Failure_Class has a level greater than or equal to 1.

Figure 6:
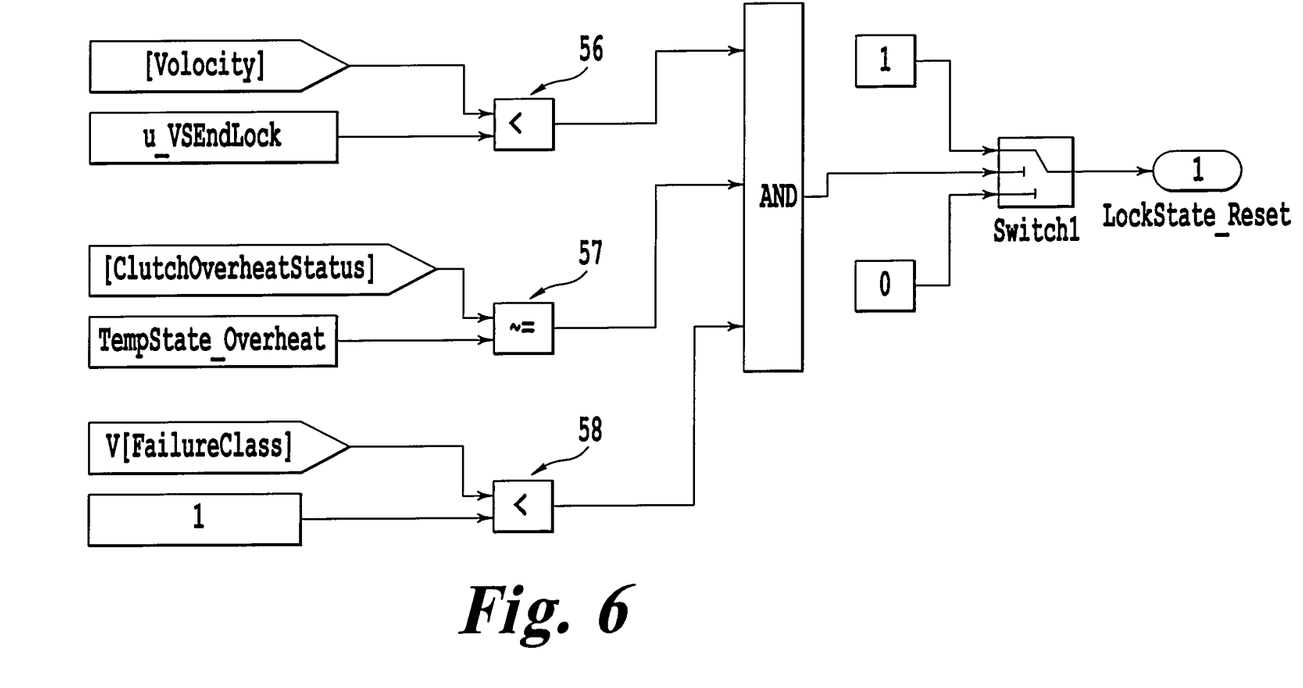
FIG. 6 is a block diagram translating the logic authorizing the return from the second transmission mode to the first transmission mode.
Figure 7:
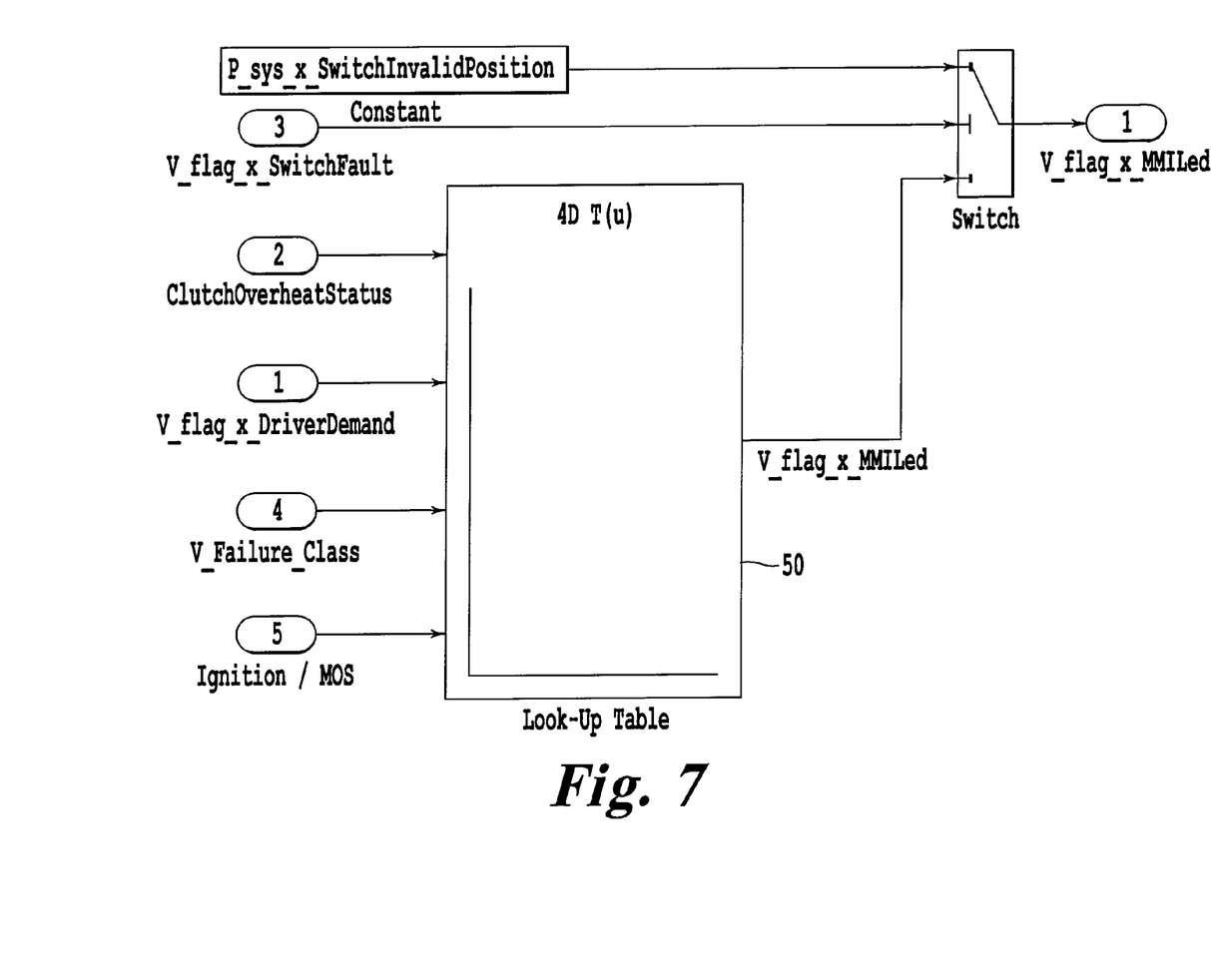
FIG. 7 is a block diagram translating the logic for establishing an information signal relating to the transmissions system and intended for the driver of the vehicle.

An embodiment of a logic allowing for the procedure for return from the "automatic 4*4" mode to the "all-terrain 4*4" mode as described previously is described below in more detail with reference to FIG. 6. For this return, a prior pulse is required on the "all-terrain 4*4" operating mode selection control button and all the conditions detailed below must be met.

The vehicle speed is under the threshold u_VSEndl_ock (logic branch 56).

The coupler is not overheated: ClutchOverheatStatus different from TempState_Overheat (logic branch 57).

The system has no failure: V_Failure_Class has a level less than 1 (logic branch 58).

Figure 4:
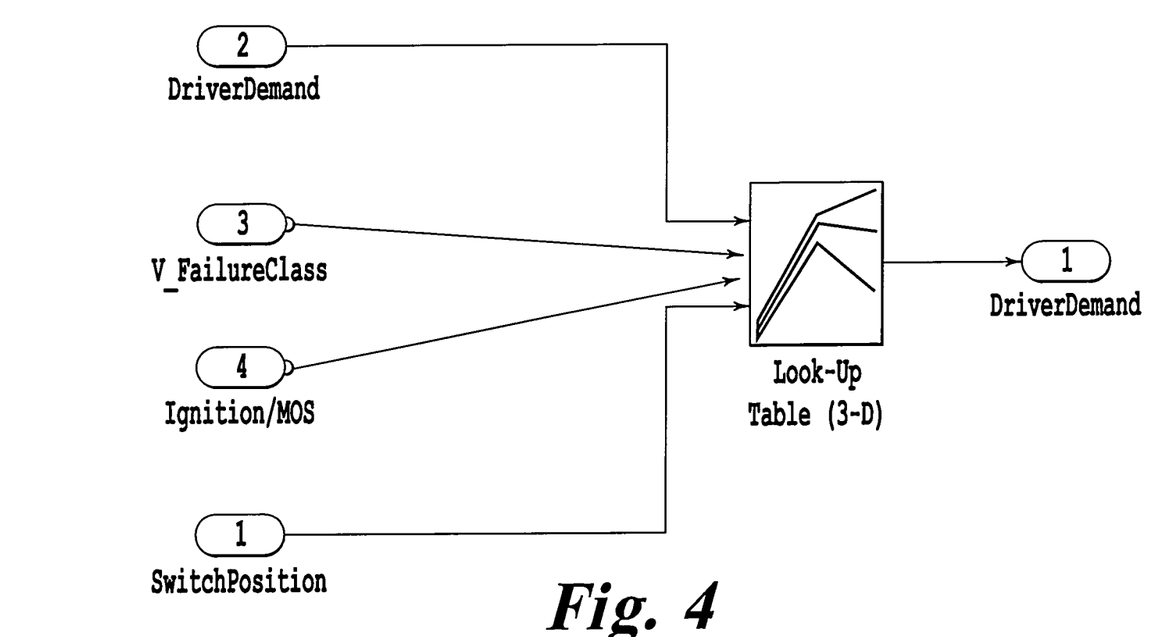
FIG. 4 is a block diagram translating the logic for setting up a signal defining the active transmission mode.

As for the signal V_flag_x_MMILed, it will be noted, in particular as represented in FIG. 4, that the signal DriverDemand translating the transmission system operating mode is dependent on the signal V_Failure_Class represented a 4×4 transmission system failure or problem category. For example, for the most serious cases where the four drive modes would be incompatible, the control method according to the invention takes over from the transmission system operating mode selection control button. Thus, for example, in the case of a problem, the "4*2" operating mode may be active when the driver requests the "automatic 4*4" or "all-terrain 4*4" operating mode. For one or more malfunctioning modes where the severity of the failures would be less serious, the control method may, for example, authorize only the "4*2" and "automatic 4*4" modes and prevent the use of the "all-terrain 4*4" mode.

The control method according to the invention is incorporated in a transmission system whose hardware architecture:

comprises at least one transmission system operating mode selection control button, where the temperature of the 4×4 coupler is measured or estimated, where the longitudinal speed of the vehicle is measured or estimated, where there is an audible or visual current mode playback display, such as, for example, a light-emitting diode display on a dashboard.

The invention claimed is:

1. A method for operating a transmission system of a motor vehicle, the transmission system including means for mechanically coupling first and second axles of the transmission system, a state of the coupling means defining a number of transmission modes, and a switch or button controlling selection of the transmission mode, the method comprising:
   activating, after the vehicle has stalled and then restarted, the transmission mode that was active before the vehicle stalled.

2. The operating method as claimed in claim 1, further comprising storing in a memory the transmission mode that is active at a time of the stall and keeping this transmission mode in this memory for a limited duration.

3. A non-transitory computer-readable data storage medium on which is stored a computer program for operating a transmission system of a motor vehicle, the transmission system including means for mechanically coupling first and second axles of the transmission system, a state of the coupling means defining a number of transmission modes, and a switch or button controlling selection of the transmission mode, and when the computer program is executed by a computer, the computer program causes the computer to execute:
   activating, after the vehicle has stalled and then restarted, the transmission mode that was active before the vehicle stalled.

4. A transmission system of a motor vehicle, the transmission system comprising:
   a coupler to mechanically couple first and second axles of a transmission system, the first axle being driven by default and the second axle being driven according to a state of the coupling means, the state of the coupling means defining a number of transmission modes;
   a switch or button to control selection of the transmission mode; and
   a computer to activate, after the vehicle has stalled and then restarted, the transmission mode that was active before the vehicle stalled.

5. The operating method as claimed in claim 1, wherein the transmission system includes three of the transmission modes.

6. The operating method as claimed in claim 2, wherein the limited duration is 30 seconds.

7. The transmission system as claimed in claim 4, wherein the computer stores in a memory the transmission mode that is active at a time of the stall and keeps this transmission mode in the memory for a limited duration.

8. The transmission system as claimed in claim 7, wherein the limited duration is 30 seconds.

* * * * *